A. ENGLAND.
PUMP VALVE.
APPLICATION FILED APR. 5, 1920.

1,417,235. Patented May 23, 1922.

INVENTOR
ALEXANDER ENGLAND
BY
ATTORNEY

UNITED STATES PATENT OFFICE.

ALEXANDER ENGLAND, OF WILKINSBURG, PENNSYLVANIA, ASSIGNOR TO THE WESTINGHOUSE AIR BRAKE COMPANY, OF WILMERDING, PENNSYLVANIA, A CORPORATION OF PENNSYLVANIA.

PUMP VALVE.

1,417,235.      Specification of Letters Patent.      Patented May 23, 1922.

Application filed April 5, 1920. Serial No. 371,252.

*To all whom it may concern:*

Be it known that I, ALEXANDER ENGLAND, a citizen of the United States, residing at Wilkinsburg, in the county of Allegheny and State of Pennsylvania, have invented new and useful Improvements in Pump Valves, of which the following is a specification.

This invention relates to valves, and more particularly to the inlet and discharge valves as usually employed in pumps.

In order to yieldingly maintain the valves seated, it is customary to provide coil springs which act on the valves.

In assembling the valves with their corresponding springs in the pump structure, due to lateral or vertical movement, the springs are occasionally displaced from their proper position, causing improper action of the valves.

The principal object of my invention is to provide means on the valve for holding the seating spring in its proper position, so that in assembling, the spring will not be displaced.

Figure 1:
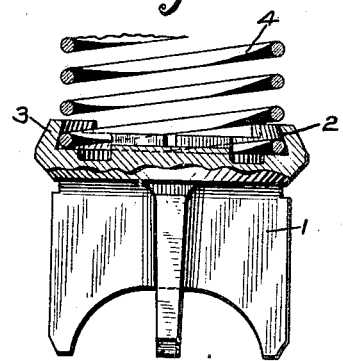
Figure 2:
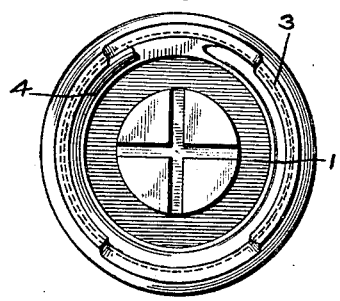

In the accompanying drawing; Fig. 1 is an elevation, partly in section, of an inlet or discharge valve, with my invention applied thereto; and Fig. 2 a plan view thereof.

In the drawing, the reference numeral 1 indicates an ordinary inlet or discharge valve, and according to my invention, the spring side of the valve is counterbored to form an annular conical recess 2 and alternate quarter sections of the flange 3, constituting the wall of the recess, are cut away to about one half the depth of the recess.

The outer diameter of the seating spring 4 is such that a coil of the spring will fit snugly within the bottom of the recess 2 and preferably such that the coil must be diametrically compressed in order to assemble the spring.

In assembling, the end of the spring is applied to the valve where the flange 3 is cut away and the spring is then rotated with respect to the valve, so that the end coil of the spring is screwed into the recess. This operation necessitates a slight diametrical compression of the spring, so that when assembled the end coil fits snugly within the recess 3.

By means of the above described construction, the spring will be held in its proper position on the valve, thus preventing displacement when the valve and spring are assembled in position in the pump structure.

With this arrangement, broken or defective springs may be quickly and easily replaced, as will be evident.

Having now described my invention, what I claim as new and desire to secure by Letters Patent, is:

1. The combination with a coil spring, of a valve having an annular conical recess with a portion of the wall of the recess cut away to permit the end coil of the spring to be screwed into the recess.

2. The combination with a coil spring, of a valve having an annular conical recess with a portion of the wall of the recess cut away to permit the end coil of the spring to be screwed into the recess, the outer diameter of the spring being greater than the shorter diameter of the recess.

In testimony whereof I have hereunto set my hand.

ALEXANDER ENGLAND.